United States Patent
Lim et al.

(10) Patent No.: US 9,115,903 B2
(45) Date of Patent: Aug. 25, 2015

(54) OVEN DOOR

(75) Inventors: Dongwan Lim, Changwon (KR); Kilyoung Yu, Changwon (KR); Byoungwoo Choi, Changwon (KR)

(73) Assignee: LG ELECTRONICS INC., Seoul (KR)

( * ) Notice: Subject to any disclaimer, the term of this patent is extended or adjusted under 35 U.S.C. 154(b) by 391 days.

(21) Appl. No.: 13/553,729

(22) Filed: Jul. 19, 2012

(65) Prior Publication Data
US 2013/0019854 A1    Jan. 24, 2013

(30) Foreign Application Priority Data

Jul. 21, 2011    (KR) .................... 10-2011-0072664

(51) Int. Cl.
| | | |
|---|---|---|
| F24C 7/04 | (2006.01) | |
| F24C 15/04 | (2006.01) | |
| F24C 15/00 | (2006.01) | |
| F23M 7/04 | (2006.01) | |
| F23M 7/02 | (2006.01) | |
| A21B 3/02 | (2006.01) | |
| F24B 13/00 | (2006.01) | |

(52) U.S. Cl.
CPC .............. *F24C 15/04* (2013.01); *F24C 15/006* (2013.01); *A21B 3/02* (2013.01); *F24B 13/004* (2013.01)

(58) Field of Classification Search
CPC ......... F24C 15/006; F24C 15/02; A21B 3/02; F24B 13/004; F23L 19/00; F23M 7/04
USPC ..... 126/198, 193, 200, 21 R, 19 R, 15 R, 190
IPC .................... F24C 7/04; F23M 7/04, 7/02, 7/00
See application file for complete search history.

(56) References Cited

U.S. PATENT DOCUMENTS

| | | | | |
|---|---|---|---|---|
| 3,731,035 A | * | 5/1973 | Jarvis et al. ................ | 219/740 |
| 4,163,444 A | * | 8/1979 | Drouin ...................... | 126/198 |

(Continued)

FOREIGN PATENT DOCUMENTS

| | | | | |
|---|---|---|---|---|
| DE | 19738601 C1 | * | 3/1999 | ............ F24C 15/00 |
| EP | 900985 A1 | * | 3/1999 | ............ F24C 15/00 |

(Continued)

OTHER PUBLICATIONS

"EP_1909035_A1_M—Mach Trans"; EP-1909035 Machine Translation; http://epo.org; Sep. 29, 2014.*

*Primary Examiner* — Gregory Huson
*Assistant Examiner* — Daniel E Namay
(74) *Attorney, Agent, or Firm* — Birch, Stewart, Kolasch & Birch, LLP

(57) ABSTRACT

An oven door is provided. The oven door includes a door panel having an air discharging opening part configured to discharge air flowing in the oven door, a door frame coupled to the door panel, the coupled door panel and door frame providing at least one air introducing hole in the bottom of the door to introduce air into the door, an inner cover located between the door panel and the door frame, the inner cover having an inner opening, the inner cover and the door frame defining a space to allow airflow, an inner glass located in the inner opening of the inner cover, and a glass holder supporting the inner glass. Air introduced through the air introducing hole flows through the space between the door frame and the inner cover at both lateral sides of the glass holder.

4 Claims, 7 Drawing Sheets

(56) References Cited

U.S. PATENT DOCUMENTS

| | | | |
|---|---|---|---|
| 4,207,863 A * | 6/1980 | Drouin | 126/198 |
| 6,904,904 B2 * | 6/2005 | Walther et al. | 126/198 |
| 7,431,029 B2 * | 10/2008 | Kim et al. | 126/198 |
| 7,708,007 B2 * | 5/2010 | Kim et al. | 126/198 |
| 7,856,973 B2 * | 12/2010 | Kim et al. | 126/273 R |
| 9,022,017 B2 * | 5/2015 | Hyun et al. | 126/21 A |
| 2004/0159317 A1 * | 8/2004 | Walther et al. | 126/198 |
| 2005/0076900 A1 * | 4/2005 | Walther et al. | 126/198 |
| 2005/0133019 A1 * | 6/2005 | Kim et al. | 126/198 |
| 2006/0219234 A1 * | 10/2006 | Larsen | 126/198 |
| 2006/0278214 A1 * | 12/2006 | Park et al. | 126/273 R |
| 2007/0131220 A1 * | 6/2007 | Kim et al. | 126/273 R |
| 2008/0110449 A1 * | 5/2008 | Brown et al. | 126/198 |
| 2008/0184984 A1 * | 8/2008 | Elkasevic | 126/198 |
| 2009/0194090 A1 | 8/2009 | Kim et al. | |
| 2009/0255524 A1 * | 10/2009 | Venezia et al. | 126/198 |
| 2010/0065035 A1 * | 3/2010 | Armstrong et al. | 126/198 |
| 2011/0214661 A1 * | 9/2011 | Hyun et al. | 126/21 A |
| 2013/0019853 A1 * | 1/2013 | Kim et al. | 126/190 |
| 2013/0186386 A1 * | 7/2013 | Trautner et al. | 126/198 |

FOREIGN PATENT DOCUMENTS

| | | | | |
|---|---|---|---|---|
| EP | 900986 A1 * | 3/1999 | | F24C 15/02 |
| EP | 1909035 A1 * | 4/2008 | | |
| EP | 1939534 A2 * | 7/2008 | | F24C 15/04 |
| FR | 2982182 A1 * | 4/2007 | | F24C 15/02 |
| FR | 2934671 A1 * | 2/2010 | | F24C 15/04 |
| JP | 55128735 A * | 10/1980 | | F24C 15/22 |
| JP | 55128736 A * | 10/1980 | | F24C 15/22 |
| KR | 10-2009-0085982 A | 8/2009 | | |
| KR | 10-1025659 B1 | 3/2011 | | |
| WO | WO 2006/064457 * | 6/2006 | | F24C 15/00 |

* cited by examiner

OVEN DOOR

CROSS-REFERENCE TO RELATED APPLICATIONS

This application is claims the benefit of priority to Korean Application No. 10-2011-0072664, filed on Jul. 21, 2011, which is herein incorporated by reference in its entirety.

BACKGROUND OF THE DISCLOSURE

1. Field of the Disclosure

The present disclosure relates to an oven, and more particularly, to an oven door.

2. Description of Related Art

Ovens are used to cook foods with electricity or gas. Such ovens include an oven chamber for cooking food and a door for opening and closing the oven chamber. Since food in the oven chamber is cooked at high temperature, the oven includes a cooling system for cooling the door and thermally insulating the oven chamber. For example, the cooling system may include a fan or use natural convection.

BRIEF SUMMARY OF THE DISCLOSURE

Exemplary embodiments provide an oven door that can be efficiently cooled.

In one exemplary embodiment, an oven door is provided. The oven door includes a door panel having an air discharging opening part configured to discharge air flowing in the oven door, a door frame coupled to the door panel, the coupled door panel and door frame providing at least one air introducing hole in the bottom of the door to introduce air into the door, an inner cover located between the door panel and the door frame, the inner cover having an inner opening, the inner cover and the door frame defining a space to allow airflow, an inner glass located in the inner opening of the inner cover, and a glass holder supporting the inner glass. Air introduced through the air introducing hole flows through the space between the door frame and the inner cover at both lateral sides of the glass holder.

In another exemplary embodiment, an oven door includes a door panel including an air discharging opening part configured to discharge air flowing in the oven door, a door frame coupled to the door panel, the door frame having a rear opening, and the coupled door panel and door frame providing at least one air introducing hole in the bottom of the door to introduce air into the door, an inner cover located between the door panel and the door frame, the inner cover having an inner opening, the inner cover and the door frame defining a space to allow airflow, a glass holder located between the inner cover and the door frame, an inner glass located in the inner opening of the inner cover and supported by the glass holder, and a rear glass fixed to the glass holder and closing the rear opening in the door frame. The inner cover guides a portion of air introduced through the air introducing hole to flow between the door panel and the inner cover, another portion of the air introduced through the air introducing hole to flow between the rear glass and the inner glass, and the other portion of the air introduced through the air introducing hole to flow outside the glass holder between the door frame and the inner cover.

In yet another exemplary embodiment, an oven door includes a door panel having an air discharging opening part configured to discharge air flowing in the oven door, a door frame coupled to the door panel, the door frame having a rear opening, and the coupled door panel and door frame providing at least one air introducing hole in the bottom of the door to introduce air into the door, an inner cover located between the door panel and the door frame, the inner cover having an inner opening, the inner cover and the door frame defining a space to allow airflow, a glass holder located between the inner cover and the door frame, an inner glass located in the inner opening of the inner cover and supported by the glass holder, and a rear glass fixed to the glass holder and closing the rear opening in the door frame. The inner cover guides a portion of the air introduced through the air introducing hole to flow between the rear glass and the inner glass and another portion of the air introduced through the air introducing hole to flow outside the glass holder between the door frame and the inner cover.

The details of one or more exemplary embodiments are set forth in the accompanying drawings and the description below. Other features will be apparent from the description and drawings, and from the claims.

BRIEF DESCRIPTION OF THE DRAWINGS

The present disclosure will become more fully understood from the detailed description given hereinbelow and the accompanying drawings which are given by way of illustration only, and thus are not limitative of the present disclosure and wherein.

DETAILED DESCRIPTION OF THE DISCLOSURE

Reference will now be made in detail to the preferred exemplary embodiments of the present disclosure, examples of which are illustrated in the accompanying drawings.

Figure 1:
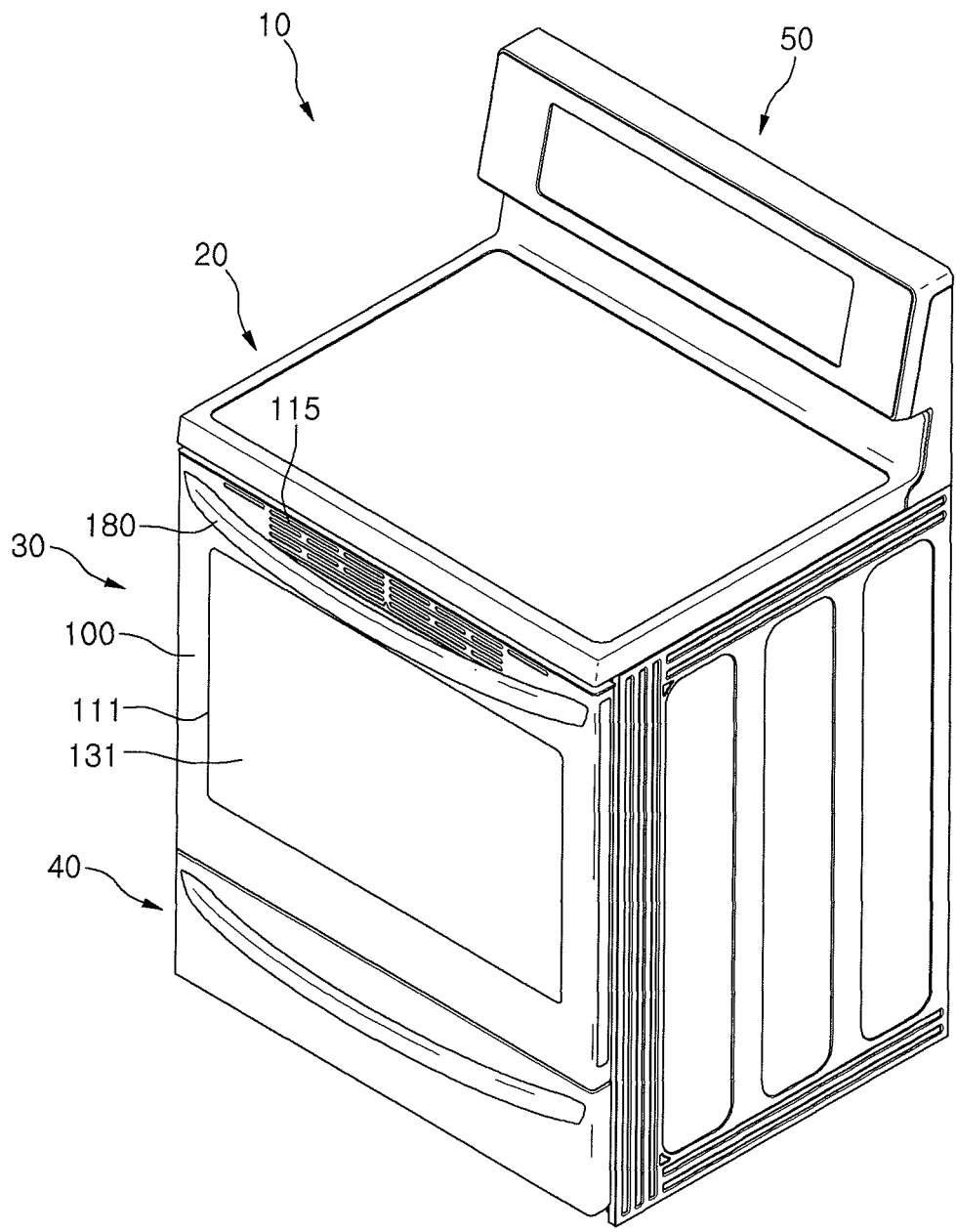
FIG. 1 is a perspective view illustrating an oven including an oven door according to a first exemplary embodiment.

Referring to FIG. 1, a cooktop 20 is disposed at the upper side of a cabinet 10 of an electric oven 1. A plurality of heaters (not shown) for heating food is disposed in the cooktop 20. An oven unit 30 is disposed in the cabinet 10 under the cooktop 20. The oven unit 30 includes an oven chamber (not shown) for cooking food. A heating source for heating food, such as a broil heater, a bake heater, and a convection device, is disposed in the oven chamber. The oven chamber is selectively opened and closed by a door 100. The door 100 is a pull-down door in which its upper end vertically rotates about its lower end. The door 100 will be described later in detail.

A drawer unit 40 is disposed at the lower side of the cabinet 10 under the oven unit 30. The drawer unit 40 thermally insulates food or a container storing food.

A control panel 50 is disposed at a top rear end of the cabinet 10 behind the cooktop 20. Signals for operating the cooktop 20, the oven unit 30, and the drawer unit 40 are input to the control panel 50. The control panel 50 displays information about operations of the cooktop 20, the oven unit 30, and the drawer unit 40.

Figure 2:
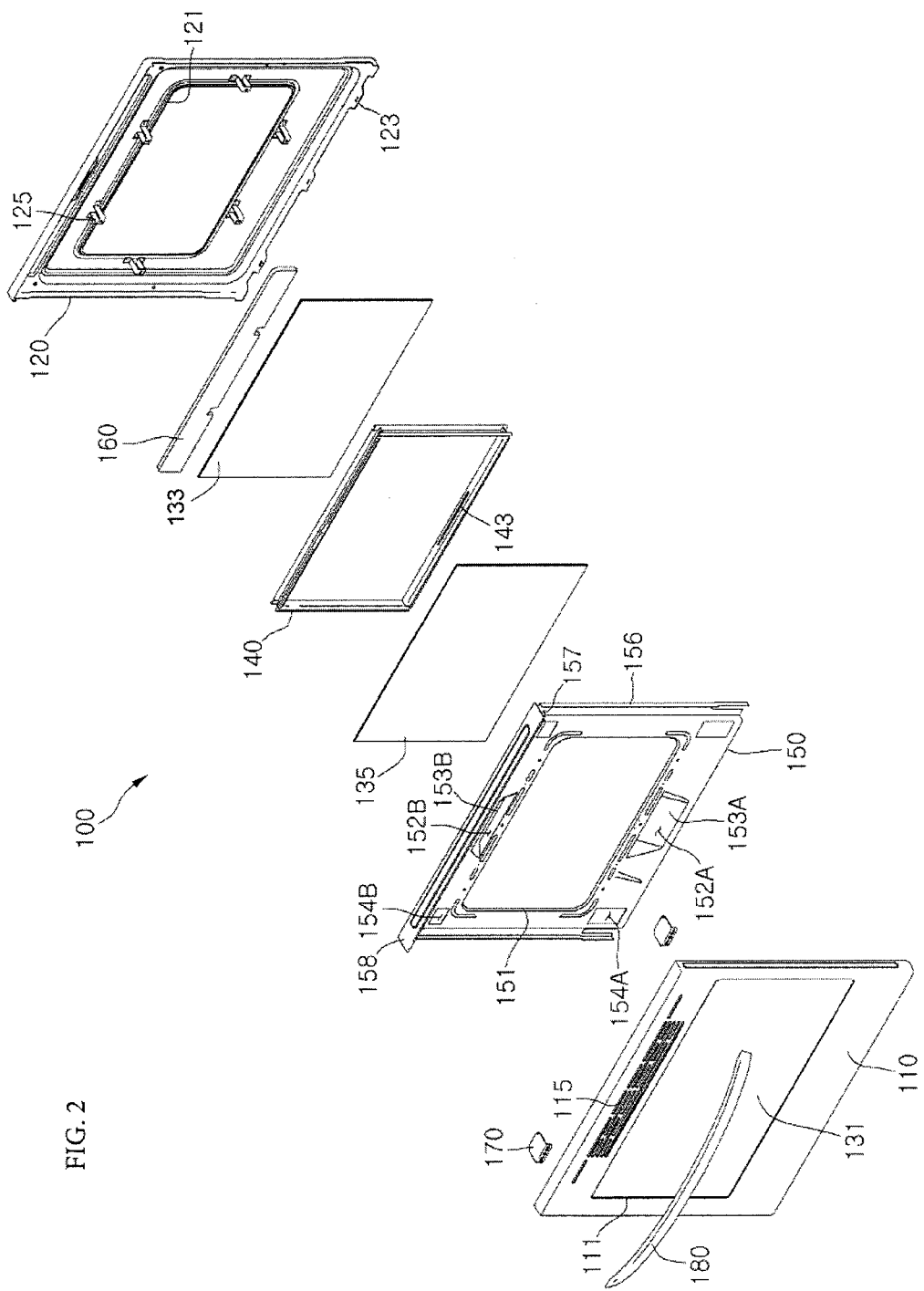
FIG. 2 is a front, exploded perspective view illustrating the oven door of FIG. 1.
Figure 3:
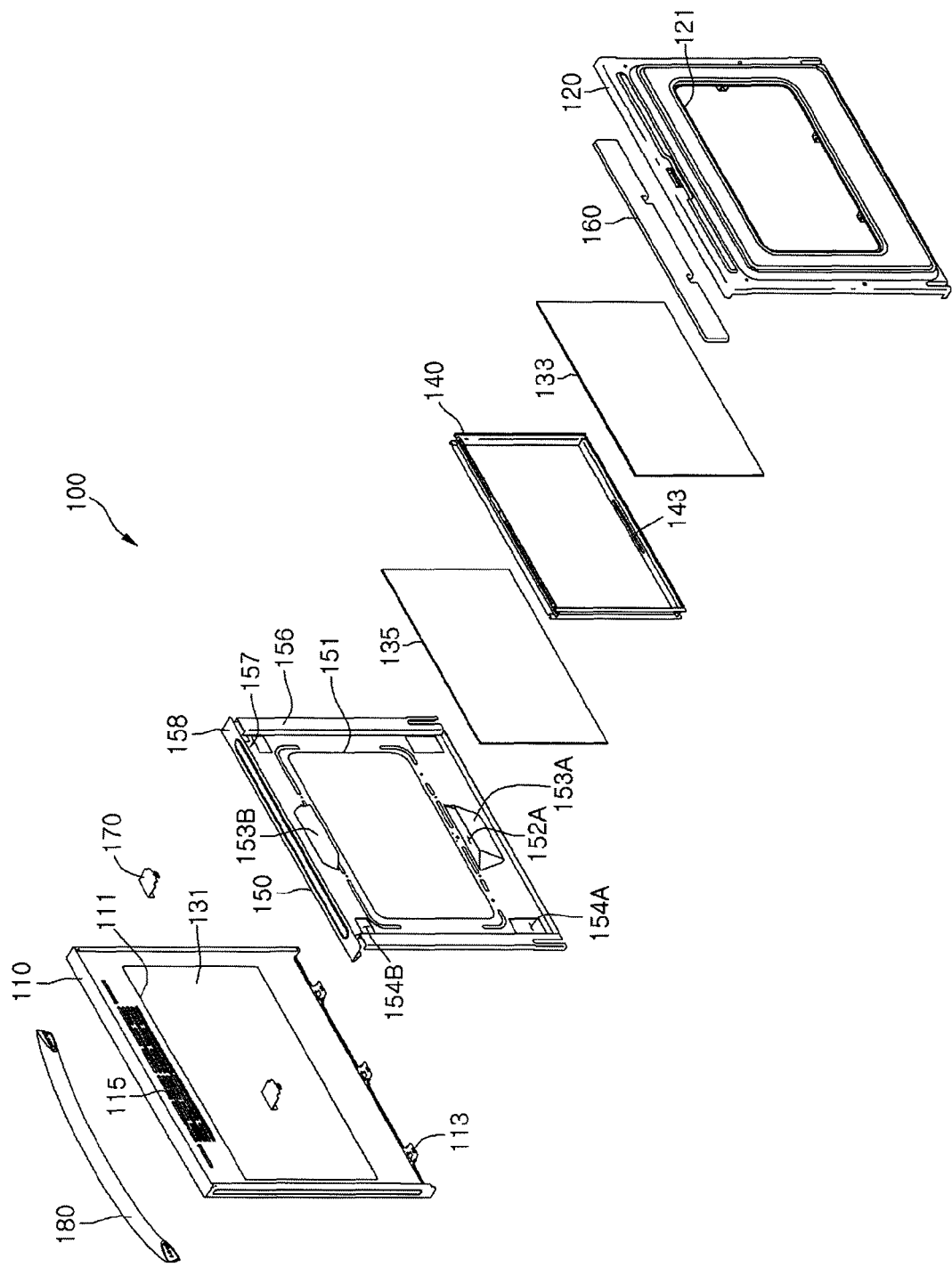
FIG. 3 is rear, exploded perspective view illustrating the oven door of FIG. 1.

Referring to FIGS. 2 and 3, the door 100 includes a door panel 110, a door frame 120, a front glass 131, a rear glass 133, an inner glass 135, a glass holder 140, an inner cover 150, an insulation 160, a door handle 180, and a bracket 170. In particular, the door panel 110 defines the front surface, the top surface, and the side surfaces of the door 100. To this end, the door panel 110 may have a flat hexahedron shape with rear and bottom openings. The door panel 110 includes a front opening 111. The front opening 111 is used to see the inside of the oven chamber. The front opening 111 is formed by cutting out a portion of the door panel 110 in a rectangle.

The lower end of the door panel 110 is provided with a plurality of first coupling ribs 113. Substantially, the first coupling ribs 113 extend rearward from the lower end of the door panel 110. The first coupling ribs 113 fix the door panel 110 and the door frame 120.

An air discharging opening part 115 is disposed in the front surface of the door panel 110 over the front opening 111. The air discharging opening part 115 is used to discharge air circulating in the door 100.

The door frame 120 defines the rear surface of the door 100. The door frame 120 is coupled to the door panel 110. The door frame 120 has a flat hexahedron shape with front and bottom openings. When the door panel 110 is coupled to the door frame 120, the inner portions of the top and side surfaces of the door panel 110 contact the outer portions of the top and side surfaces of the door frame 120. A predetermined space is formed between the door panel 110 and the door frame 120. The bottom surface of the door 100, that is, a space between the lower end of the door panel 110 and the lower end of the door frame 120 is provided with an air introducing hole 117 (see FIGS. 5 and 6) through which air is sucked or drawn into the door 100.

The door frame 120 is provided with a rear opening 121. The rear opening 121 has a shape and a size to correspond to the front opening 111, and is formed by cutting out a portion of the door frame 120.

The lower end of the door frame 120 is provided with a plurality of second coupling ribs 123. The second coupling ribs 123 extend forward from the lower end of the door frame 120. When the door panel 110 is coupled to the door frame 120, the second coupling ribs 123 at least partially overlap the first coupling ribs 113 in a vertical arrangement. First fasteners (not shown) pass through the overlapped portions of the first and second coupling ribs 113 and 123 to couple the first and second coupling ribs 113 and 123 to each other, thereby fixing the lower ends of the door panel 110 and the door frame 120. The bottom portion of the door 100 except for the first and second coupling ribs 113 and 123 forms the air introducing hole 117.

The door frame 120 is provided with a plurality of holder supporters 125. The holder supporters 125 guide the glass holder 140 holding the inner glass 135 to an intended position, and temporarily fix the glass holder 140. As shown, the holder supporters 125 may be spaced apart from each other on the front surface of the door frame 120 near the rear opening 121.

The front glass 131 is disposed in the front opening 111. That is, the front opening 111 may be substantially closed by the front glass 131. The rear glass 133 closes the rear opening 121. When the door 100 closes the oven chamber, a user can see the inside of the oven chamber through the front glass 131 and the rear glass 133.

The inner glass 135 is disposed in the door 100, that is, between the front glass 131 and the rear glass 133. The inner glass 135 thermally insulates the oven chamber. The inner glass 135 is spaced apart from the rear glass 133 to form an air space therebetween.

The glass holder 140 supports the rear glass 133 and the inner glass 135. The glass holder 140 is provided approximately in the form of a frame, and includes glass supporting recesses 141 (see FIG. 5) for supporting the borders of the rear glass 133 and the inner glass 135. The glass supporting recesses 141 are spaced apart from each other in the back-and-forth direction, and thus, the rear glass 133 and the inner glass 135 are spaced apart from each other in the back-and-forth direction. When the borders of the rear glass 133 and the inner glass 135 are inserted in the glass supporting recesses 141, the holder supporters 125 temporarily fix the glass holder 140 to the front surface of the door frame 120.

Figure 5:
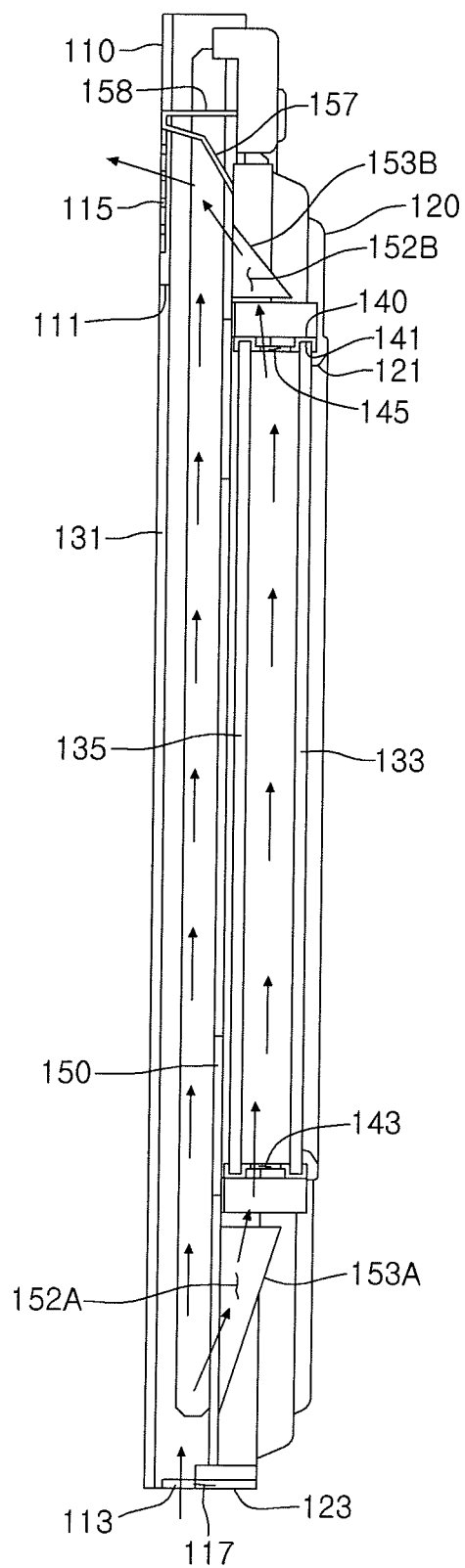
FIGS. 5 and 6 are vertical cross-sectional views illustrating air flows in the oven door of FIG. 1.

A communication hole 143 is disposed in the middle of the bottom surface of the glass holder 140, and a communication hole 145 (see FIG. 5) is disposed in the middle of the top surface of the glass holder 140. Air flows between the rear glass 133 and the inner glass 135 through the communication holes 143 and 145. The communication holes 143 and 145 are formed by partially cutting out the top and bottom surfaces of the glass holder 140. For convenience in description, the communication hole 143 disposed in the bottom surface of the glass holder 140 is referred to as an inlet communication hole, and the communication hole 145 disposed in the top surface of the glass holder 140 is referred to as an outlet communication hole, as illustrated in FIG. 5.

The inner cover 150 guides air, introduced into the door 100 through the air introducing hole 117, to flow through the door 100 and be discharged out of the door 100 through the air discharging opening part 115. In detail, the inner cover 150 guides a portion of air, introduced into the door 100, to flow between the door panel 110 and the inner cover 150 and be discharged out of the door 100. Also, the inner cover 150 guides the rest of the air introduced into the door 100 to flow between the rear glass 133 and the inner glass 135 or flow through inner spaces of the door 100 at both sides of the rear glass 133 and the inner glass 135, particularly, through spaces between the door frame 120 and the inner cover 150 at both sides of the rear glass 133 and the inner glass 135, and to be discharged out of the door 100.

The inner cover 150 has an approximately rectangular plate shape. The inner cover 150 is disposed in the door 100, particularly, between the door panel 110 and the inner glass 135 to divide the door 100 into front and rear parts. In other words, the inner cover 150 divides the door 100 into the space between the door panel 110 and the inner cover 150, and the space between the door frame 120 and the inner cover 150.

The inner cover 150 is provided with an inner opening 151. The inner opening 151 is formed by cutting out a portion of the inner cover 150 to correspond to the shapes and sizes of the front opening 111 and the rear opening 121.

The inner cover 150 is provided with a first introducing opening 152A and a first discharging opening 152B. The first introducing opening 152A and the first discharging opening 152B are disposed at the lower and upper sides of the inner opening 151, respectively. The first introducing opening 152A is disposed at the lower side of the inlet communication hole 143, and the first discharging opening 152B is disposed at the upper side of the outlet communication hole 145. Air is introduced between the rear glass 133 and the inner glass 135 through the first introducing opening 152A. Air flowing between the rear glass 133 and the inner glass 135 is discharged through the first discharging opening 152B.

The first introducing opening 152A and the first discharging opening 152B are provided with a first introducing guide 153A and a first discharging guide 153B, respectively. The first introducing guide 153A guides air introduced through the first introducing opening 152A to the inlet communication hole 143. The first discharging guide 153B guides air discharged through the outlet communication hole 145 to the first discharging opening 152B. The first introducing guide 153A and the first discharging guide 153B connect the inlet communication hole 143 and the outlet communication hole 145 to the first introducing opening 152A and the first discharging opening 152B, respectively. The first introducing guide 153A extends obliquely rearward and upward from the rear surface of the inner cover 150 to correspond to the first introducing opening 152A. The first discharging guide 153B extends obliquely rearward and downward from the rear surface of the inner cover 150 to correspond to the first discharging opening 152B.

The inner cover 150 is provided with second introducing openings 154A and second discharging openings 154B. The second introducing openings 154A are disposed under the inner opening 151 at both sides of the first introducing opening 152A. The second discharging openings 154B are disposed over the inner opening 151 at both sides of the first discharging opening 152B. The second introducing openings 154A and the second discharging openings 154B are disposed outside of an area defining the width of the inner opening 151. The second introducing openings 154A and the second discharging openings 154B communicate with the space between the door frame 120 and the inner cover 150. Air is introduced through the second introducing openings 154A between the door frame 120 and the inner cover 150 at both sides of the glass holder 140. Air is discharged through the second discharging openings 154B between the door frame 120 and the inner cover 150 at both sides of the glass holder 140.

Air barriers 156 are disposed at both side ends of the inner cover 150. The air barriers 156 extend rearward from the side ends of the inner cover 150. The rear ends of the air barriers 156 contact the side front ends of the door frame 120. The air barriers 156 completely separate the space between the door frame 120 and the inner cover 150 from the space between the door panel 110 and the inner cover 150.

An air guide 157 is disposed at the upper end of the inner cover 150. The air guide 157 extends obliquely forward and upward from the upper end of the inner cover 150. The front end of the air guide 157 contacts the rear surface of the door panel 110 to correspond to the air discharging opening part 115. The air guide 157 guides air discharged through the first and second discharging openings 152B and 154B, to the air discharging opening part 115.

The front end of the air guide 157 is provided with a reinforcing rib 158 that extends rearward from the front end of the air guide 157. For example, the reinforcing rib 158 may extend to the left and right sides of the door 100, and be supported by a top inner portion of the door frame 120.

The insulation 160 is disposed between the door frame 120 and the inner cover 150 to correspond to the upper side of the glass holder 140. The insulation 160 thermally insulates the door 100.

Figure 4:
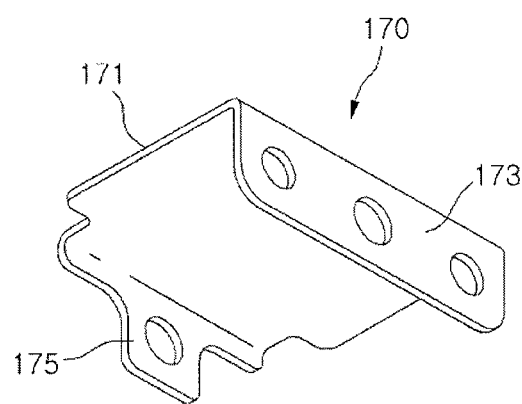
FIG. 4 is a perspective view illustrating a bracket of the oven door of FIG. 1.

Referring to FIG. 4, the bracket 170 is disposed between the door panel 110 and the inner cover 150. A second fastener (not shown) for fixing the door handle 180 to the door panel 110, and a third fastener (not shown) for fixing the door frame 120 and the inner cover 150 are fixed to the bracket 170. Thus, when the second and third fasteners are coupled to the bracket 170, the upper portions of the door panel 110 and the door frame 120 can be fixed.

The bracket 170 includes a main body 171, a first coupling part 173, and a second coupling part 175. The main body 171 has a plate shape with its length extending in the back-and-forth direction of the door 100. A constant distance between the door panel 110 and the inner cover 150 may be maintained by the main body 171. The first and second coupling parts 173 and 175 extend vertically from the front and rear ends of the main body 171. The first and second coupling parts 173 and 175 contact the rear surface of the door panel 110 and the front surface of the inner cover 150, respectively. The second fastener sequentially passes through the first coupling part 173 and the door panel 110, and couples to the door handle 180. The third fastener sequentially passes through the door frame 120 and the inner cover 150, and couples to the second coupling part 175.

Referring again to FIGS. 2 and 3, the door handle 180 is held by a user to open and close the door 100. The door handle 180 may have a predetermined curvature. Both ends of the door handle 180 contact the front surface of the door panel 110 to correspond to both sides of the air discharging opening part 115. Thus, a portion of the door handle 180 is disposed at the front side of the air discharging opening part 115. That is, substantially, the door handle 180 may prevent the air discharging opening part 115 from being directly exposed to the front side.

Figure 6:
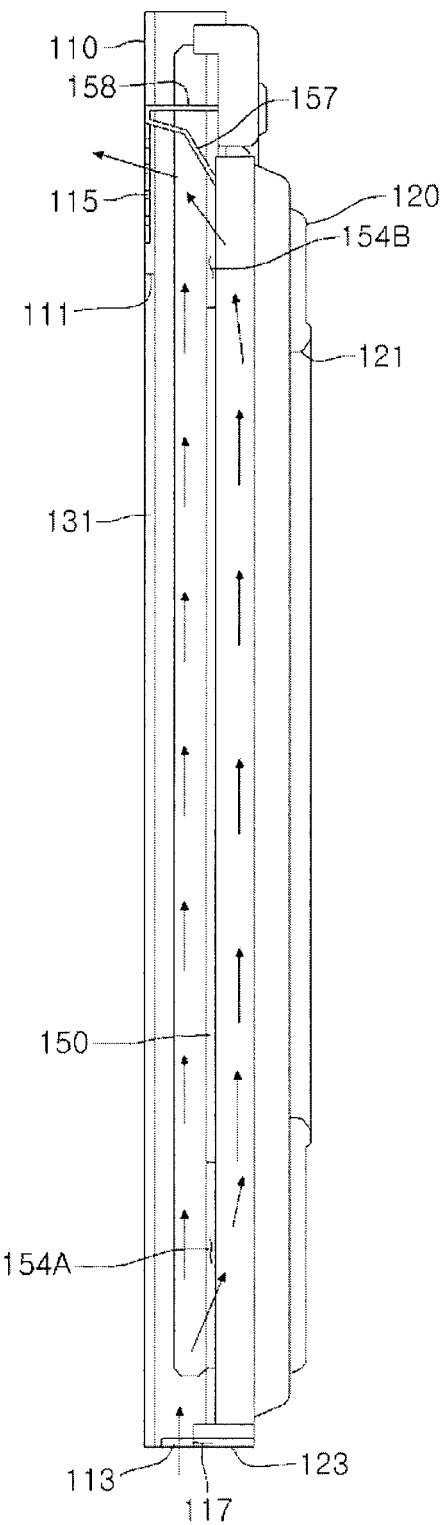

Hereinafter, air flows in the oven door will be described in detail with reference to the accompanying drawings. Referring to FIGS. 5 and 6, air is introduced into the door 100 between the door panel 110 and the inner cover 150 through the air introducing hole 117. A portion of the introduced air flows between the door panel 110 and the inner cover 150, and then, is discharged out of the door 100 through the air discharging opening part 115.

As best seen in FIG. 5, another portion of the introduced air flows between the rear glass 133 and the inner glass 135 through the first introducing opening 152A and the inlet communication hole 143. The air flowing through the first introducing opening 152A is guided to the inlet communication hole 143 by the first introducing guide 153A.

As such, since the air flowing between the rear glass 133 and the inner glass 135 is moved upward by natural convection, the air substantially functions as an air curtain for preventing heat from being transferred out of the oven chamber through the door 100. The air flowing between the rear glass 133 and the inner glass 135 is discharged between the door panel 110 and the inner cover 150 through the outlet communication hole 145 and the first discharging opening 152B. The air discharged through the outlet communication hole 145 is guided to the first discharging opening 152B by the first discharging guide 153B.

The air flowing between the door panel 110 and the inner cover 150 through the first discharging opening 152B is discharged out of the door 100 through the air discharging opening part 115. The air flowing between the door panel 110 and the inner cover 150 through the first discharging opening 152B is guided to the air discharging opening part 115 by the air guide 157.

As best seen in FIG. 6, the rest of the air introduced between the door panel 110 and the inner cover 150 through the air introducing hole 117 flows between the door frame 120 and the inner cover 150 through the second introducing openings 154A at both sides of the glass holder 140. The air flowing between the door frame 120 and the inner cover 150 is moved upward by natural convection, and is discharged between the door panel 110 and the inner cover 150 through the second discharging openings 154B. The air flowing between the door panel 110 and the inner cover 150 is guided by the air guide 157, and is discharged out of the door 100 through the air discharging opening part 115.

As a result of this first exemplary embodiment, a cooling system for a door 100 of an oven is provided where airflow is divided between three flow paths in the door 100.

Figure 7:
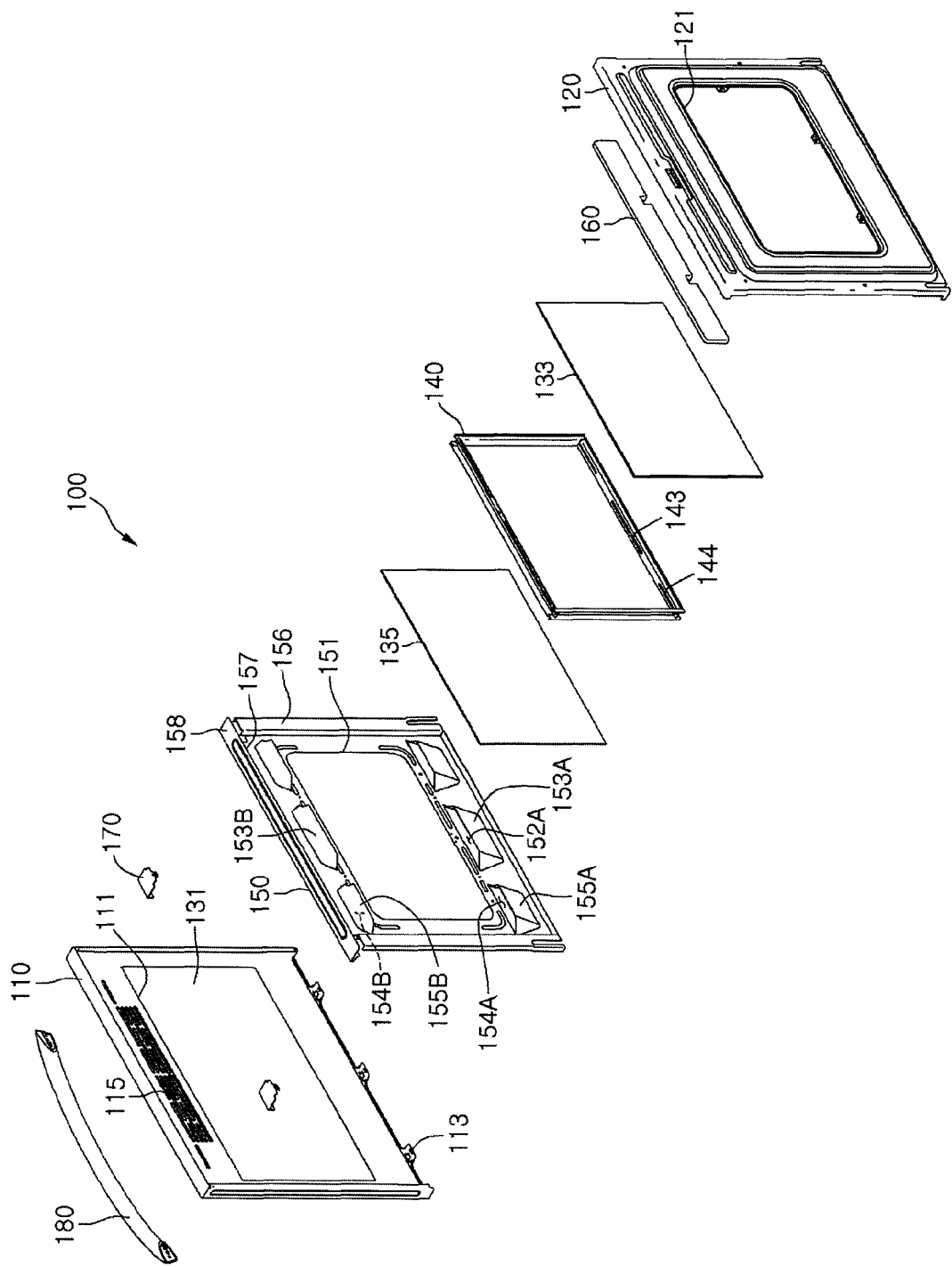
FIG. 7 is an exploded perspective view illustrating an oven door according to a second exemplary embodiment.

Hereinafter, an oven door according to a second exemplary embodiment will be described in detail with reference to the accompanying drawings. FIG. 7 is an exploded perspective view illustrating an oven door according to the second exemplary embodiment. Like reference numerals denote like elements in the first and second exemplary embodiments, and a description of the same components as those of the first exemplary embodiment will be omitted in the second exemplary embodiment.

Referring to FIG. 7, the bottom of the glass holder 140 is provided with a first inlet communication hole 143 and second inlet communication holes 144. The top of the glass holder 140 is provided with a first outlet communication hole 145 and second outlet communication holes (not shown). The first inlet communication hole 143 and the first outlet communication hole 145 are substantially the same as the inlet communication hole 143 and the outlet communication hole 145 of the first exemplary embodiment, and thus, are disposed in the middle of the top and bottom of the glass holder 140. The second inlet communication holes 144 are disposed in the bottom of the glass holder 140 at both sides of the first inlet communication hole 143. The second outlet communication holes are disposed in the top of the glass holder 140 at both sides of the first outlet communication hole 145.

The second introducing openings 154A and the second discharging openings 154B of the current exemplary embodiment are wider than those of the first exemplary embodiment. Portions of the second introducing openings 154A and the second discharging openings 154B are disposed in the area defining the width of the inner opening 151, and the rest thereof is disposed outside of the area. As a result, portions of the second introducing openings 154A and the second discharging openings 154B communicate with the second inlet communication holes 144 and the second outlet communication holes, respectively, and the rest thereof communicate with the space between the door frame 120 and the inner cover 150. Thus, air is introduced through the second introducing openings 154A to the space between the rear glass 133 and the inner glass 135 and the space between the door frame 120 and the inner cover 150.

In the current exemplary embodiment, second introducing guides 155A and second discharging guides 155B are provided as well as the first introducing guide 153A and the first discharging guide 153B. That is, the second introducing openings 154A and the second discharging openings 154B are provided with the second introducing guides 155A and the second discharging guides 155B. The second introducing guides 155A guide air introduced through the second introducing openings 154A, to the second inlet communication holes 144 and the space between the door frame 120 and the inner cover 150. The second discharging guides 155B guide air discharged through the second outlet communication holes and the space between the door frame 120 and the inner cover 150, to the second discharging openings 154B.

Although a single inner glass is provided according to the first and second exemplary embodiments, two or more inner glasses may be provided. In this case, air may flow through a space between the inner glasses and/or a space between one of the inner glasses and the rear glass.

According to the exemplary embodiments, the door can be more efficiently cooled.

Although exemplary embodiments have been described with reference to a number of illustrative exemplary embodiments thereof, it should be understood that numerous other modifications and exemplary embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An oven door, comprising:
    a door panel including an air discharging opening part configured to discharge air flowing in the oven door, the door panel configured to define a front surface of the oven door;
    an inner cover coupled to a rear side of the door panel, the inner cover including:
        an inner opening formed in an inner side thereof;
        a first introducing opening formed at a position between a lower edge of the inner opening and a lower edge of the inner cover;
        a first discharging opening formed at a position between an upper edge of the inner opening and an upper edge of the inner cover;
        a first introducing guide to guide air introduced through the first introducing opening towards the first discharging opening;
        a first discharging guide to guide air discharged through the first discharging opening towards the air discharging opening part of the door panel;
        second introducing openings formed at both side lower edges of the inner cover; and
        second discharging openings formed at both side upper edges of the inner cover;
    a door frame coupled to the rear side of the door panel and having a rear opening, wherein at least one air introducing hole in a bottom of the door to introduce air into the door is formed when the door panel and the door frame are coupled to each other;
    a glass holder disposed between the inner cover and the door frame, the glass holder including:
        left and right holding parts which extend vertically;
        upper and lower holding parts which extend horizontally;
        an inner space defined by the left, right, upper and lower holding parts;
        an inlet communication hole formed in the lower holding part and communicating with the first introducing opening of the inner cover; and
        an outlet communication hole formed in the upper holding part and communicating with the first discharging opening of the inner cover;
    an inner glass to cover the inner opening of the inner cover, and supported by the glass holder;
    a rear glass to cover the rear opening of the door frame, and supported by the glass holder at a position, wherein front and rear surface of the inner space are covered by the inner glass and the rear glass, respectively;
    a first air flow passage defined between the door panel and the inner cover, wherein a portion of the air introduced through the air introducing hole flows along the first air flow passage and is discharged through the air discharging opening part;
    a second air flow passage configured to connect the first introducing opening, the inlet communication hole, the inner space of the glass holder, and the outlet communication hole, wherein another portion of the air introduced through the air introducing hole flows along the second air flow passage and is discharged through the air discharging opening part; and a third air flow passage configured to connect the second introducing openings and the second discharging openings, and defined outside the glass holder between the inner cover and the door frame, wherein the other portion of the air introduced through the air introducing hole flows along the third air flow passage and is discharged through the air discharging opening part.

2. The oven door of claim 1, wherein the inner cover includes an air guide configured to guide air flowing in the space between the rear glass and the inner glass and air flowing in the space between the door frame and the inner cover to the air discharging opening part.

3. The oven door according to claim 2, wherein the air guide extends forward from an upper end of the inner cover such that a front end of the air guide contacts a rear surface of the door panel corresponding to an upper side of the air discharging opening part.

4. The oven door according to claim 3, wherein the air guide obliquely extends forward and upward from the upper end of the inner cover.

\* \* \* \* \*